Aug. 17, 1965   G. F. MAGLOTT   3,201,031
DIFFERENTIAL PRESSURE CONTROL FOR PIPLESS PUMPING
Filed Jan. 10, 1964   3 Sheets-Sheet 2

INVENTOR
GEORGE F. MAGLOTT
BY Maxwell Fish
ATTORNEY

INVENTOR.
GEORGE F. MAGLOTT

United States Patent Office 3,201,031
Patented Aug. 17, 1965

3,201,031
DIFFERENTIAL PRESSURE CONTROL FOR
PIPLESS PUMPING
George F. Maglott, North Attleboro, Mass., assignor to
Harwood Engineering Company, Walpole, Mass., a corporation of Massachusetts
Filed Jan. 10, 1964, Ser. No. 336,929
8 Claims. (Cl. 230—53)

The present invention relates to an improved differential pressure control for pipless pumping.

The invention is herein disclosed as an improvement in a system for pipless pumping of compressible fluids at high pressure, such as that shown, for example, in the U.S. Patent 2,819,835 to Newhall, in which there is provided a system for delivering a continuous flow of compressible fluid at high delivery pressures from a plurality of intensifier units, in combination with a hydraulic system for applying a relatively noncompressible fluid medium to each low pressure piston face at a relatively lower predelivery or loading pressure and thereafter at a full delivery pressure. The hydraulic pressure fluid is delivered to the low pressure piston faces in a predetermined sequence and at the selected predelivery or delivery pressures as required by a suitable control means.

In the illustrated construction the delivery pressure at which the hydraulic system operates is directly related to the pressure at which the compressed fluid or gas is delivered to the process served by the compressor. The delivery pressure of the hydraulic medium is that pressure which will produce the required output pressure of the compressed gas dictated by the needs of the process. In the embodiment of the invention shown this pressure control as dictated by the process is represented by an outlet pressure valve through which the compressed fluid is discharged through the high pressure manifold of the system.

It is a principal object of the invention to provide a novel and improved system for supplying hydraulic fluid under pressure to the low pressure sides of a group of intensifiers delivering a compressible fluid at high pressure to the process, said hydraulic pressure including a delivery pressure and a slightly lower predelivery pressure which are readily and immediately responsive to fluctuations of process demand pressure, and including means for maintaining the predelivery pressure at all times at a slightly lower value than said delivery pressure.

It is a further object of the invention to provide in a multiple unit intensifier system of the general type described a novel and improved control system for directing hydraulic pressure fluids selectively at a delivery pressure and at a predelivery pressure to the low pressure side of each intensifier unit in turn in accordance with a predetermined pattern of operation of the system.

With the above and other objects in view as may hereinafter appear, the several features of the invention consists in the devices, combinations and arrangement of parts hereinafter described and claimed which together with the advantages to be obtained thereby will be readily undertsood by one skilled in the art from the following description taken in connection with the accompanying drawing, in which:

Figure 3:
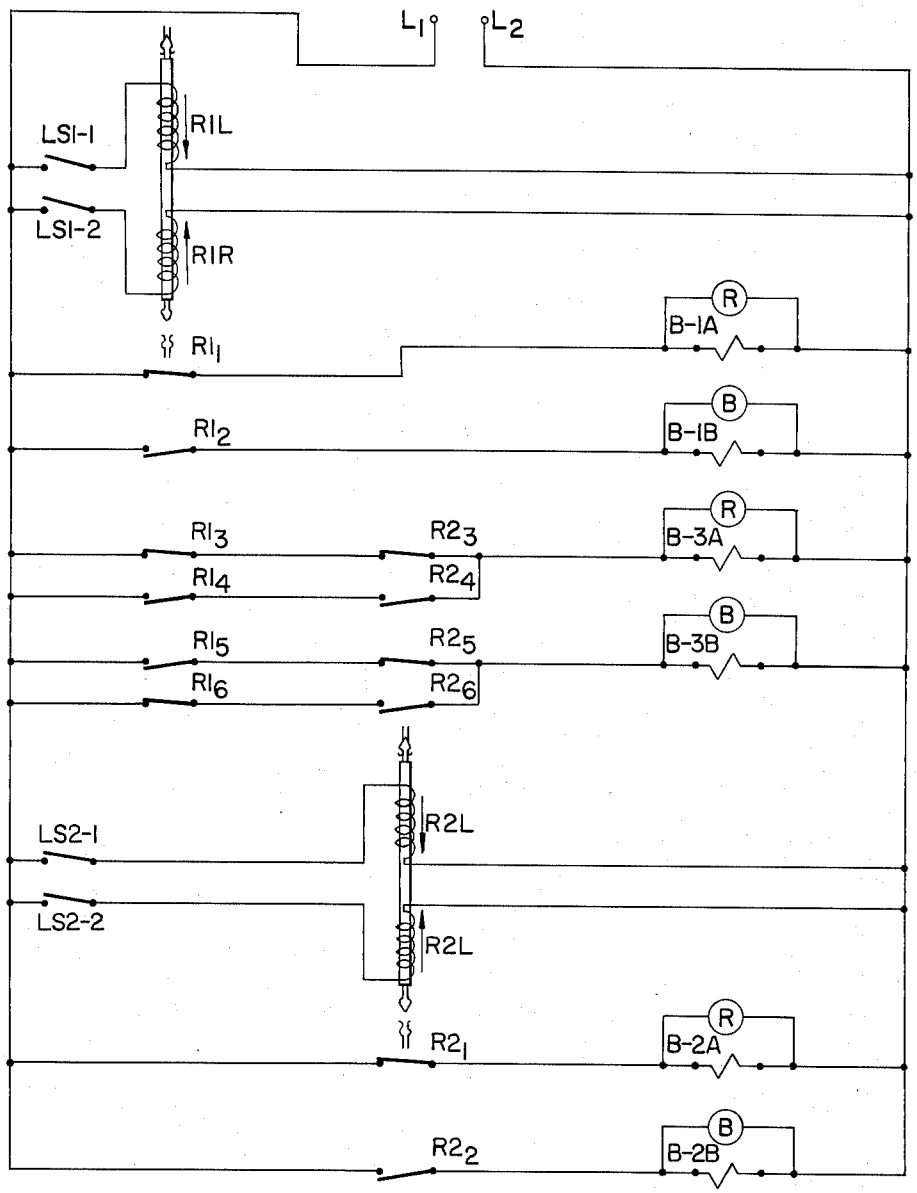

FIG. 3 is a one-line diagram of the electrical controls for the system, said controls being shown only in such detail as required to illustrate the connection of the present invention therewith; and FIG. 4 is a diagram of a three unit intensifier assembly illustrating a regulator valve assembly adapted to maintain the hydraulic fluid pressure level in those intensifier units being charged at a low predelivery level having a definite relation to delivery pressure level of the hydraulic fluid being delivered to another intensifier unit at the delivery level.

Figure 1:
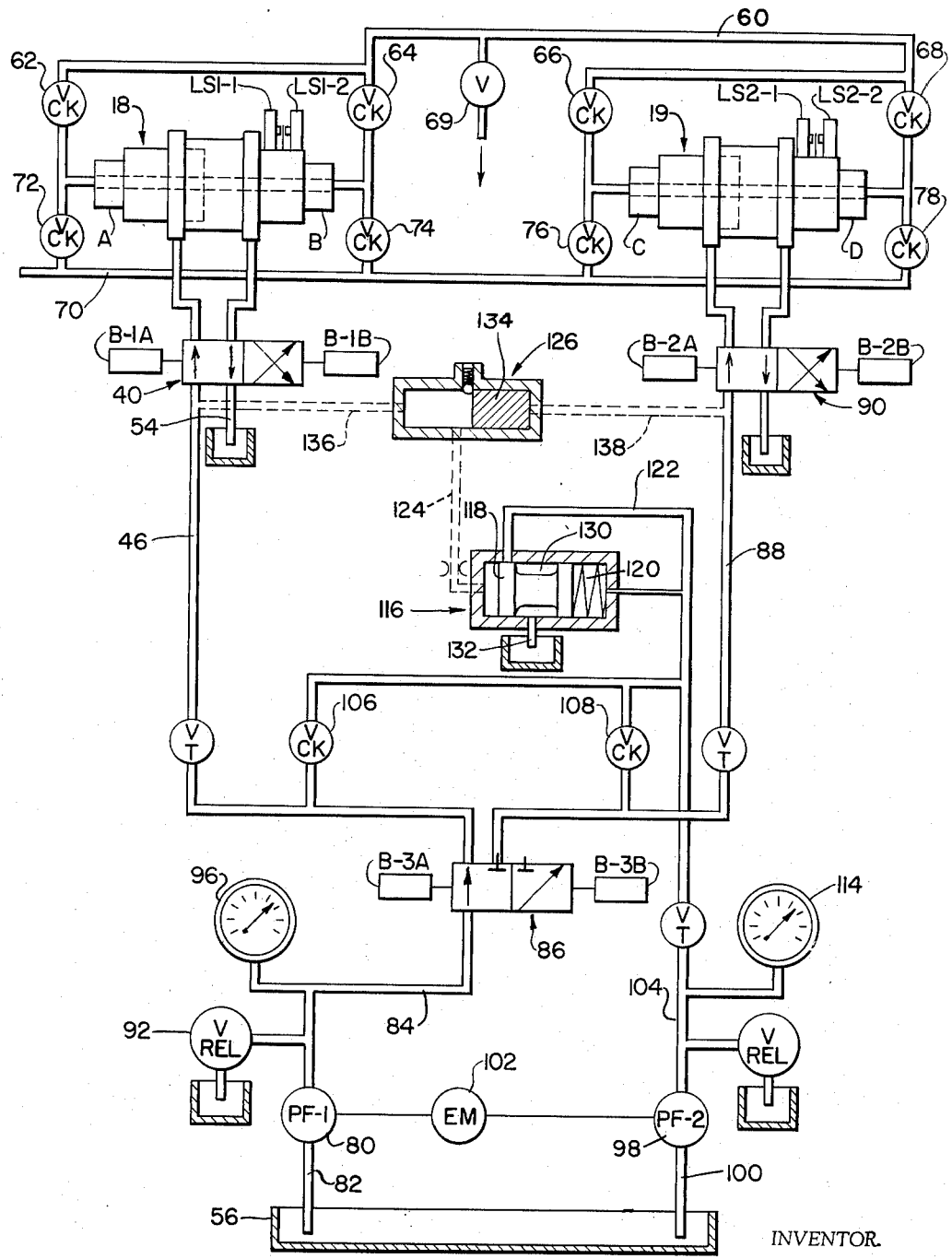
FIG. 1 is a diagrammatic view of two double intensifier units arranged in parallel for pipless pumping of a gas into a common delivery manifold and a differential pressure hydraulic drive therefor illustrating in a preferred form applicant's improvement for maintaining a pressure differential in the hydraulic driving system irrespective of variations in output pressure of the system.
Figure 2:
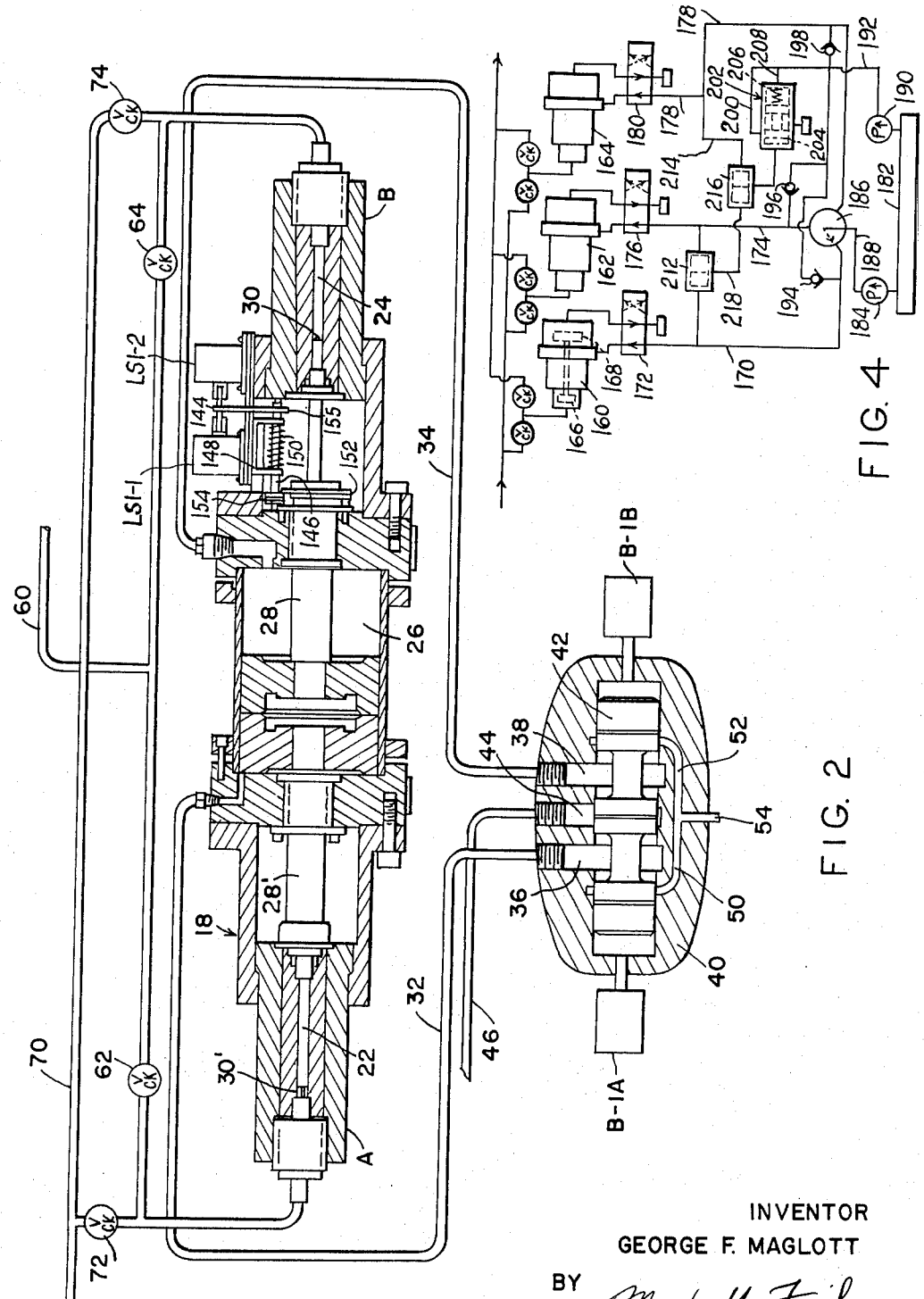
FIG. 2 is an enlarged detail view partly in section of one of the double intensifier units above illustrated and of a four-way reversing valve therefor.

In the embodiment of the invention shown, particularly in FIG. 1, and as further illustrated in FIG. 2, two double acting intensifier units designated respectively at 18 and 19 are provided connected in functional parallelism. Since the two double intensifier units shown are identical in construction, only the unit 18 will be specifically described in connection with the detailed illustration of FIG. 2.

Intensifier unit 18 consists of an outer shell or valve body having at the two ends thereof high pressure compression chambers 22 and 24 of relatively small diameter, and an intervening low pressure chamber 26. Mounted within the valve body is a piston having two end portions of small diameter slidably fitted in the high compression chambers 22, 24 and a middle portion 28 of larger diameter which is fitted to slide within the low compression chamber 26.

As shown in FIG. 2 the piston 28 is made up of two separate members 28, 28' having low pressure piston faces, 29, 29', respectively, and high pressure faces, 30, 30', respectively, said members being normally in contact with one another to operate as a single unit.

The two ends of the low pressure chamber 26 are connected by pipe connections 32, 34 with ports 36, 38 respectively formed in the casing 40 of a four-way valve generally indicated in FIG. 1 and illustrated in further detail in FIG. 2. The casing 40 is formed with a cylindrical aperture to receive a removable valve body 42. The casing 40 is also provided with a centrally disposed pressure inlet port 44 which is connected by means of a pipe 46 with a hydraulic fluid pressure supply line. Two exhaust ports 50 and 52 in the casing 40 connect with one another and with an exhaust pipe 54 by means of which exhaust fluid is returned to the main reservoir 56. This connection is shown only in diagrammatic form in FIG. 1. The valve body 42 is formed with spool portions at each end and midway of valve body 42, said spools being separated by two land portions. The valve body 42 is constructed and arranged so that movement of the valve body 42 to the right from the theoretical position shown in FIG. 2 causes the pipe connection 34 with the right hand end of the low pressure chamber 26 to be connected with the exhaust port 52, and the pipe connection 32 with the left hand end of the low pressure chamber 26 to be connected with the supply port 44. Under these conditions the piston 28 of the intensifier unit is moved to the right. Movement of the four-way valve 42 to the left operates in a reverse manner to move the valve body 28 of the intensifier unit to the left.

The high pressure chambers of the several units indicated respectively at A, B, C and D in FIG. 1 are connected in parallel relation to a delivery manifold 60. A check valve is provided in each connection, the several check valves referred to being indicated respectively at 62, 64, 66 and 68. Each check valve is set to prevent backflow of the compressible fluid which is forced into the manifold 60 at the delivery pressure. It will be understood that the delivery pressure in the delivery manifold 60 is determined by the back pressure in the process. In order to indicate this arrangement a back pressure valve 69 in the process is shown in the diagrammatic FIG. 1.

The high pressure chambers A, B, C and D are also connected with supply 70 by means of which the fluid is supplied to the high pressure chambers at a lower supply pressure. The supply connection to the high pressure chambers A, B, C and D have provided therein check valves indicated respectively at 72, 74, 76 and 78. The supply line check valves 72, 74, 76 and 78, inclusive, are set to permit compressible fluid to be drawn completely through said valves into the high pressure chambers at a less than delivery pressure. Intensifier pistons are operated in a predetermined sequence so that compressible fluid is drawn or sucked into each high pressure chamber in turn and is subsequently discharged therefrom at delivery pressure.

The hydraulic fluid is supplied to the intensifier units at a full delivery pressure from a pump 80 which draws hydraulic fluid from the reservoir 56 through a conduit 82. The pump 80 is connected by a conduit 84 with a delivery pressure transfer valve 86 which for one position of the transfer valve is connected with the hydraulic pressure supply pipe 46, reversing valve 40 and intensifier unit 18. For an alternative position of the transfer valve 86 the pump 80 is connected through a hydraulic pressure supply pipe 88 and a second reversing valve 90 with the intensifier 19. The delivery pressure supply line 84 has connected therewith a safety relief valve 92 which acts if pressure is increased beyond a safe limit to open a bypass connection 94 to exhaust. There is also provided a visually readable pressure gage 96 so that the operator will know at all times what load the sump is carrying.

Hydraulic fluid is supplied to the intensifier units at a lower predelivery pressure from a second pump 98 connected with the reservoir 56 by means of a supply pipe 100. The delivery pressure pump 80 and the predelivery pressure pump 98 are both continuously driven by an electric motor 102. The predelivery pump 98 is connected by means of a supply line 104 and two check valves 106, 108 with the hydraulic pressure supply pipes 46 and 88 to the intensifier units 18 and 19. The arrangement is such that hydraulic fluid at predelivery pressure is always supplied through one of said check valve to whichever intensifier unit is not connected through the delivery pressure transfer valve 86 with the delivery pressure pump 80. A safety relief valve 110 having an exhaust connection 112 to the reservoir 56, and a pressure gage 114 are connected into the supply line 104.

In the illustrated construction a device is provided for controlling the level or predelivery pressure at a predetermined differential value with relation to the delivery pressure of the hydraulic medium supplied to the low pressure piston faces of the intensifier units, which is particularly adapted to maintain this differential during any variations or fluctuation in the level of delivery pressure which may take place in response to demands of the process. To this end a differential pressure regulating valve 116 is provided having an axially movable spool 118 adapted to be shifted in one direction by means of a compression spring 120 and by the predelivery pressure directed against the end of the spool by means of a pipe connection 122 from the supply line 104 from the predelivery pump 98. Movement of the spool 118 to the left is opposed by the full delivery pressure supplied through a connecting pipe 124 which is connected through a shuttle valve 126 with whichever hydraulic pressure supply pipe 46 or 88 through which delivery pressure is at the particular moment being delivered through the delivery pressure transfer valve 86. Movement of the spool 118 of the differential pressure regulator valve 116 to the left from its normally closed position to the right causes hydraulic fluid from the predelivery supply line 104, 122 to flow through an annular groove 130, a spool 118, to an exhaust connection 132 through which the hydraulic fluid is returned to the reservoir 56. With this arrangement it will be evident that any increase in the predelivery pressure with relation to the delivery pressure will cause the differential pressure regulator spool 118 to move to the left spilling predelivery pressure through the annular groove 130. Any increase in the delivery pressure on the other hand will cause the spool 118 to move to the right closing the differential pressure regulator valve thus permitting the predelivery pressure to correspondingly increase. The shuttle valve 126 above referred to is provided with a shuttle element 134, one end of the valve being connected by a pipe line 136 with hydraulic pressure supply pipe 46 and the other end of the valve being connected by the pipe 138 with the hydraulic pressure supply pipe 88.

The double intensifier units shown operate in the following manner to maintain a smooth, even delivery of the compressed gas to the process without any bumps or so-called pips.

It is assumed that the piston of the left hand intensifier unit is being driven to the right by said hydraulic system at delivery pressure. The piston of the right hand intensifier unit is also being driven to the right by said hydraulic system at predelivery pressure, or is stalled as the gas being compressed thereby is brought to the full predelivery level. At the end of its stroke to the right, the piston of the left hand intensifier unit 18 operates limit switch LS1-2 which reverses the reversing valve 40 thus starting the piston of intensifier unit 18 back to the left. At the same time the delivery pressure transfer valve is shifted so that hydraulic fluid from the full delivery pressure pump 80 is now delivered through supply pressure line 88 to the piston of the right hand intensifier unit 19 which is now driven at the full delivery pressure to the right hand end of its stroke. At the same time hydraulic fluid at predelivery pressure is supplied from the predelivery pump 98 through supply pipe 104, through check valve 106 and supply pipe 46 to the intensifier unit 18. The piston of the left hand intensifier unit 18 is moved to the left at the predelivery pressure or is stalled as the compressed gas reaches the predelivery level. As the piston of the right hand intensifier unit 19 now reaches the limit of its movement to the right, limit switch LS2-2 operates reversing the reversing valve 90 so that the piston of the right hand intensifier unit moves to the left, and at the same time causes the delivery pressure transfer valve 86 to be shifted so that the piston of the left hand intensifier unit 18 is now driven to the left at delivery pressure while the piston of the second intensifier 19 is driven to the left at the predelivery pressure from the predelivery pump 98 through the supply pipe 104 and check valve 108 connecting with the supply pipe 88 to the right hand intensifier 19. When the piston of the first intensifier 18 now moving to the left reaches the limit position in which it engages limit switch LS1-1 reversing valve 40 is again reversed causing the piston to return to the right. At the same time the delivery pressure transfer valve 86 again shifts directing fluid delivery pressure from delivery pressure pump 80 through the pressure supply line 88, and causing hydraulic pressure at predelivery pressure to be supplied from predelivery pressure pump 98 through the hydraulic pressure supply line 46. As a last step in the cycle, the piston of the second intensifier unit 19 reaches the limit of its movement to the left at delivery pressure at which point it engages the limit switch LS2-1 causing reversing valve 90 to operate reversing the travel of said piston, and at the same time reverses the position of the delivery pressure transfer valve 86 so that the piston of the first intensifier unit 18 now continues its movement to the right at delivery pressure, and the piston of the second intensifier 19 starts its return movement to the right at predelivery pressure.

The electrical system by means of which the double intensifier units 18 and 19 are operated in the manner above described includes the four microswitches above referred to of which microswitches LS1–1 and LS1–2 as specifically shown in FIG. 2 are mounted on the double intensifier unit 18 in spaced relation to one another to be engaged by a vertically disposed switch contact arm 144 which projects upwardly between the two switches and at its lower end is mounted on a shifting rod 146 carried on a U-shaped bracket 148 within a leakage chamber provided within the double intensifier unit 18. Centering springs 150 coiled about the shifting rod 146 between the arms of the bracket 148 tend to maintain the shifting rod and switch contact arm 144 normally in an intermediate neutral position. A contact member 152 supported to move as a unit with the intensifier piston 28 is arranged upon movement of the piston to the left hand limit of movement to engage a stop 154 on the shifting rod 146 to engage the switch contact arm 144 with the microswitch LS1–1. Movement of the piston 28 to the right hand limit of movement causes the lug 152 to engage with the depending stop 155 formed integrally with the switch arm 144 to move the switch arm into engagement with the microswitch LS1–2. It will be understood that the second intensifier 19 is similarly provided with microswitches LS2–1 and LS2–2 which are arranged to be automatically operated in a manner similar to that above described for microswitches LS1–1 and LS1–2. Reversing valve 40 for the intensifier unit 18 is shifted in one direction by a solenoid B–1A and in the opposite direction by a solenoid B–1B. Reversing valve 90 for the second intensifier unit 19 is operated in one direction by a solenoid B–2A and in the opposite direction by a second solenoid B2–B. The delivery pressure transfer valve 86 is shifted in one direction by a solenoid B–3A and in the opposite direction by a second solenoid B–3B.

Microswitches LS1–1 and LS1–2 are engaged to operate a double coil latch-type relay switch of which coil R1L is energized by microswitch LS1–1 moving the switch to the position shown in FIG. 3, in which switch contact $R1_1$ is closed energizing solenoid B–1A so that the reversing valve 40 is conditioned as shown in FIG. 1 to supply hydraulic fluid to the left hand end of the intensifier unit 18 which is traveling to the right. Switch contact $R1_2$ is open so that solenoid B–1B is deenergized. The operation and effect of switch contacts $R1_3$ to $R1_6$, inclusive, will be discussed in connection with the operation of a second double-coil latch-type relay switch R2L, R2R.

Microswitches LS2–1 and LS2–2 associated with the second intensifier unit 19 similarly control the operation of a second two-coil latch-type relay R2L, R2R. For the position shown in FIGS. 1 and 3, in which the piston of the intensifier unit 19 is traveling to the right, microswitch LS2–1 will have been previously operated to energize coil R2L. Switch contact $R2_1$ is closed energizing solenoid B–2A while switch contact $R2_2$ is open de-energizing solenoid B2B so that the reversing valve 90 is in the position shown in FIG. 1, causing hydraulic fluid at the predelivery level to be delivered through hydraulic pressure supply line 88 to the left hand end of the second intensifier unit 19.

Switch contacts $R1_3$ to $R1_6$, inclusive, of the two-coil latch-type relay switch R1L, R1R and the corresponding switch contacts $R2_3$ to $R2_6$, inclusive, of the two-coil latch-type relay switch R2L, R2R are particularly constructed and arranged to determine which of the two solenoids B–3A and B–3B is energized at each reversal of each intensifier piston, so that the delivery of the hydraulic fluid at delivery pressure is always shifted from one intensifier unit to the other to complete the piston stroke of the latter intensifier unit. For the position shown in FIGS. 1 and 3 in which both pistons are traveling to the right, and in which delivery pressure is being delivered to the left hand end of intensifier unit 18, contacts $R1_3$ and $R2_3$ are both closed causing solenoid B–3A to be energized. The arrangement of the remaining switch contacts is such that solenoid B–3B is deenergized.

When piston 18 reaches the end of its travel to the right, microswitch LS1–2 is actuated energizing coil R1R to reverse the position of the two-coil latch-type relay switch R1L, R1R. The positions of contacts $R1_1$ and $R1_2$ are reversed causing solenoid B–1A of the reversing valve 40 to be deenergized and the solenoid B–1B to be energized reversing the direction of travel of the intensifier 18 from right to left. The position of each of the switch contacts $R1_3$ to $R1_6$, inclusive, is reversed, while the positions of the contacts $R2_3$ to $R2_6$, inclusive, associated with the two-coil latch-type relay switch R2L, R2R remain unchanged. The piston associated with second intensifier unit 19 continues to move to the right. Since $R1_3$ is now opened and switch contact $R2_3$ is closed and in the next circuit switch contact $R1_4$ is closed, while switch contact $R2_4$ remains open, solenoid B–3A associated with the delivery pressure transfer valve 86 is deenergized. Contact $R1_5$ is now closed and combines with contact $R2_5$ which remains closed to complete a circuit through the alternate solenoid B–3B thus reversing the position of the delivery pressure transfer valve 86 causing hydraulic pressure at delivery level now to be supplied to the left hand end of the intensifier unit 19.

Movement of the piston associated with intensifier unit 19 to the end of its delivery stroke to the right causes microswitch LS2–2 to be actuated energizing coil R2R of the two-coil latch-type relay switch R2L, R2R. Switch contact $R2_1$ opens and contact $R2_2$ closes thus deenergizing solenoid B–2A, and energizing solenoid 2–2B of reversing valve 90, causing the direction of travel of the intensifier piston to be reversed. Since both double coil latch-type relay switches are now in the reverse positions from those shown in FIG. 3, switch contacts $R1_3$ and $R2_3$ are both open, whereas switch contacts $R1_4$ and $R2_4$ are both closed, thus energizing delivery pressure transfer valve B–3A, whereas switch contact $R1_5$ and $R2_5$ are respectively closed and open and switch contacts $R1_6$ and $R2_6$ are respectively open and closed thus deenergizing the solenoid B–3B, so that the delivery pressure transfer valve 86 is returned to the position of FIG. 1. The pistons associated with each of the intensifier units 18 and 19 are now moving to the left, the piston associated with intensifier 18 at delivery pressure and the piston associated with intensifier unit 19 at predelivery pressure.

Completion of the delivery stroke of the piston associated with intensifier unit 18 causes microswitch LS1–1 to be actuated energizing coil R1L thus returning the two-coil latch-type relay switch R1L, R1R to the position of FIG. 3, while the two-coil latch-type relay switch R2L, R2R remains in the reverse position from that shown in FIG. 3. The direction of travel of the piston associated with the intensifier unit 18 is thus shifted from left to right, and the position of the delivery pressure transfer valve 86 is again reversed causing delivery pressure to be delivered through the hydraulic supply line 88 to the right hand end of the intensifier unit 19.

Finally, the piston associated with the intensifier unit 19 completes its delivery stroke to the left actuating microswitch LS2–1, thus returning the two-coil latch-type switch R2L, R2R to the position of FIG. 3, reversing the travel of the piston associated with intensifier unit 19 from left to right, and again reversing the delivery pressure transfer valve 86 so that delivery pressure is now delivered through supply line 46 to the left hand end of intensifier unit 18 completing the cycle.

FIG. 4 of the drawings illustrates the application of applicant's differential valve assembly for maintaining the desired differential between predelivery pressure and delivery pressure of the hydraulic medium delivered to each of the units of a three intensifier unit assembly. The intensifier assembly of FIG. 4 comprises three single intensifier units 160, 162, 164. Each intensifier unit is provided with a single high pressure element having a high pressure face 166 and a low pressure element 168 having opposed low pressure piston faces, as shown in dotted lines in FIG. 4. Intensifier unit 160 is supplied with hydraulic pressure fluid through a pipe line 170 and reversing valve 172, intensifier unit 162 is supplied with hydraulic pressure fluid through a supply line 174 and reversing valve 176, and intensifier unit 164 is similarly supplied with hydraulic pressure fluid through supply line 178 and reversing valve 180. Hydraulic pressure fluid at the delivery level is supplied selectively to the pipe lines 170, 174 and 178 from a reservoir 182 by means of a hydraulic pressure fluid delivery pump 184, a cylindrical selector valve 186 and a connecting pipe line 188.

Hydraulic fluid pressure is supplied to the nonselected intensifier units at the predelivery level to recharge from a predelivery pump 190, a pipe line 192, a branch line including a check valve 194 connecting with the pipe line 170, a second branch line including a check valve 196 connecting with the pipe line 174, and a third branch line including check valve 198 connecting with the pipe line 178. An upward extension 200 of the predelivery pipe line 192 is connected to the side of a differential pressure regulating valve 202 having spool 204 and a biasing spring 206.

The differential pressure valve 202 is connected to maintain the desired differential between the delivery and predelivery pressures being supplied in any given instance to the respective intensifier units, in the following manner:

A sensing connection 208 between the right hand end of the valve and the extension 200 of the predelivery pressure line tends to push the valve spool 202 to the left to a predelivery pressure spill position. A sensing connection is maintained between the left hand end of the differential pressure valve 202 and whichever pipe line is carrying hydraulic pressure at the delivery level through connections which comprise a shuttle valve 212 having the ends thereof connected respectively to pipe lines 170 and 174, and a second shuttle valve 216, one end of which is connected to the third pipe line 178 by means of a sensing connection 214, and the other end of which is connected by a sensing connection 218 with a centrally located outlet from the shuttle valve 212. A further connection is provided between a centrally disposed outlet from the shuttle valve 216 and the left hand end of the differential pressure regulating valve 202. With this arrangement it will be appreciated that, when hydraulic pressure fluid is being delivered at delivery pressure to pipe line 170 and intensifier unit 160 and at the lower predelivery pressure to the pipe lines 174 and 178 and the remaining intensifier units, shuttle valves 212 and 216 will both be shifted to the right, connecting pipe line 170 with the left hand end of the differential pressure regulating valve 202. When hydraulic pressure fluid is delivered at the delivery pressure level to the pipe line 174 and intensifier unit 162, shuttle valve 212 will be moved to the left while the shuttle valve 216 remains in its right hand position thus connecting the differential pressure valve with pipe line 174. When hydraulic pressure fluid at the delivery pressure level is delivered to the right hand pipe line 178 and intensifier unit 164 the delivery pressure is transmitted through the sensing connection 214 to the right hand side of the shuttle valve 216 causing the shuttle valve to be shifted so that the pipe line 178 is connected with the left hand end of the differential pressure regulating valve 202.

The examples given in FIGS. 1 and 4 illustrate suitable arrangements of shuttle valves which are employed to provide a sensing connection between the differential pressure regulating valve and any selected intensifier unit of an intensifier unit assembly to which hydraulic pressure fluid is supplied sequentially at the delivery pressure. It will be understood that the invention in its broader aspects is not limited to the number of intensifier units to which the hydraulic pressure fluid is supplied sequentially at delivery and predelivery pressures, or to any particular arrangement or number of shuttle valves which may be required ot provide a sensing connection between the differential pressure regulating valve and whichever of the intensifier units is being supplied with the hydraulic medium at delivery pressure depending upon the number of intensifier units employed.

The invention having been described what is claimed is:

1. In an intensifier assembly adapted for delivering a smooth and continuous flow of compressible fluid at a high delivery pressure having a plurality of intensifier units each including a high pressure piston face and low pressure piston faces for effecting a compression and return stroke of each said high pressure piston face, pipe connections with said high pressure piston faces for delivering a compressible fluid against a back pressure determined by demand, and means for supplying said compressible fluid at a precompression pressure to said high pressure piston faces, and means for supplying a substantially noncompressible fluid to said low pressure faces for moving said high pressure faces progressively so that one high pressure piston is always advancing at a high compression demand pressure, while a second high pressure piston is advanced at a precompression pressure, and a third high pressure piston is moved in the return direction, the combination of a source from which said noncompressible pressure fluid is supplied for loading said low pressure piston faces at a delivery pressure which will produce said high pressure piston face demand pressure, a second source from which said low pressure noncompressible fluid is supplied for loading said low pressure piston faces at a lower predelivery pressure, means including a separate supply line to each said intensifier unit through which said low pressure noncompressible fluid is supplied to the low pressure faces associated with each said high pressure piston face, a noncompressible fluid delivery pressure transfer valve shiftable upon completion of the high pressure compression stroke of each successive intensifier unit to connect said noncompressible fluid delivery pressure source with the fluid pressure supply line to a succeeding intensifier unit thereby advancing said next suceeding intensifier unit at said high compression demand pressure, one-way connections from said noncompressible fluid predelivery pressure source to each said noncompressible fluid pressure supply line for continuously supplying said noncompressible fluid at said predelivery pressure to each said hydrualic fluid supply line, and a control device operable upon completion of the high pressure compression stroke of each sucessive intensifier unit to effect a return movement of said intensifier unit and simultaneously to shift said noncompressible fluid delivery pressure transfer valve to connect said non-compressible fluid delivery source with the supply line to a said intensifier unit advancing at said precompression pressure, thereby continuing the advance of said last-mentioned intensifier unit at high compression demand pressure.

2. In an intensifier assembly adapted for delivering a smooth and continuous flow of compressible fluid at a high delivery pressure having a plurality of intensifier units each including a high pressure piston face and low pressure piston faces for effecting a compression and return stroke of each said high pressure piston face, pipe connections with said high pressure piston faces for delivering a compressible fluid against a back pressure determined by demand, and means for supplying said compressible fluid at a precompression pressure to said high pressure piston faces, and means for supplying a substantially noncompressible fluid to said low pressure faces for moving said high pressure faces progressively so that one high pressure piston is always advancing at a high compression demand pressure, while a second high pressure piston is advanced at a precompression pressure, and a third high pressure piston is moved in the return direction, the combination of a source from which said noncompressible pressure fluid is supplied for loading said low pressure piston faces at a delivery pressure which will produce said high pressure piston face demand pressure, a second source from which said low pressure noncompressible fluid is supplied for loading said low pressure piston faces at a lower predelivery pressure, means including a separate supply line to each said intensifier unit through which said low pressure noncompressible fluid is supplied to the low pressure faces associated with each said high pressure piston face, a noncompressible fluid delivery pressure transfer valve shiftable upon completion of the high pressure compression stroke of each successive intensifier unit to connect said non-compressible fluid delivery pressure source with the fluid pressure supply line to a succeeding intensifier unit thereby advancing said next succeeding intensifier unit at said high compression demand pressure, one-way connections from said noncompressible fluid predelivery pressure source to each said noncompressible fluid pressure supply line for continuously supplying said noncompressible fluid at said predelivery pressure to each said hydraulic fluid supply line, a differential pressure regulating valve connected with said means for maintaining said noncompressible pressure fluid from said predelivery pressure source at a predelivery pressure level related to said delivery pressure including a pressure sensing connection between said regulating valve and said predelivery hydraulic pressure supply line, and selectively operable pressure sensing connections between said regulating valve and each said delivery pressure pipe line, and selector means responsive to variations in pressure between those delivery pressure pipe lines carrying predelivery and delivery noncompressible fluid pressures for rendering operative only the further pressure sensing connection between said differential pressure regulating valve and the delivery pressure pipe line carrying said delivery pressure.

3. In an intensifier assembly adapted for delivering a smooth and continuous flow of compressible fluid compressing a pair of double intensifier units each having opposed high and low pressure piston faces, pipe connections with each said high pressure piston face for delivering said compressible fluid against a back pressure determined by demand, the combination of for each intensifier unit a hydraulic fluid pressure supply line, and a reversing valve shiftable to supply said hydraulic fluid pressure alternatively to said opposed low pressure piston faces, a source from which a hydraulic pressure fluid is supplied for loading said low pressure piston faces at a delivery pressure which will produce said high pressure piston face demand pressure, a second source from which said hydraulic pressure fluid is supplied for loading said low pressure piston faces at a low predelivery pressure, a delivery pressure transfer valve shiftable to connect said delivery pressure source alternately with each of said hydraulic fluid pressure supply lines, connections from said hydraulic fluid predelivery pressure source to each said hydraulic fluid pressure supply line continuously supplying hydraulic fluid at said predelivery pressure to both hydraulic fluid supply lines, and a control device operable upon completion of the delivery stroke of the high pressure piston face of a said intensifier unit to reverse the reversing valve of said unit and simultaneously to shift said delivery pressure transfer valve to deliver hydraulic fluid at delivery pressure to the other said intensifier unit.

4. In an intensifier assembly adapted for delivering a smooth and continuous flow of compressible fluid at a high delivery pressure comprising a pair of double intensifier units having opposed high and low pressure piston faces, pipe connections with said high pressure piston faces for delivering a compressible fluid against a back pressure determined by demand, and means for supplying said compressible fluid at a precompression pressure to said high pressure piston faces, the combination of for each said intensifier unit a hydraulic pressure fluid supply line, and a reversing valve shiftable to supply hydraulic fluid under pressure from said supply line alternately to said low pressure piston faces, a source from which said hydraulic pressure fluid is supplied for loading said low pressure piston faces at a delivery pressure which will produce said high pressure piston face demand pressure, a second source from which said hydraulic pressure fluid is supplied for loading said low pressure piston faces at a low predelivery pressure, means including a delivery pressure transfer valve shiftable to connect said delivery pressure source alternately with one and the other said hydraulic fluid pressure supply line, one-way connections from said second hydraulic fluid predelivery pressure source continuously supplying hydraulic fluid to each said hydraulic fluid supply line at a low predelivery pressure, and a control system comprising for each said intensifier unit a controller actuated by the movement of the high pressure piston face of each said intensifier unit to the end of its delivery stroke to reverse the reversing valve for said intensifier unit, and simultaneously to shift said delivery pressure transfer valve to deliver hydraulic fluid at delivery pressure to the other said intensifier unit.

5. In an intensifier assembly adapted for delivering a smooth and continuous flow of compressible fluid at a high delivery pressure comprising a pair of double intensifier units having opposed high and low pressure piston faces, pipe connections with said high pressure piston faces for delivering a compressible fluid against a back pressure determined by demand, and means for supplying said compressible fluid at a precompression pressure to said high pressure piston faces, the combination of a separate pipe line and reversing valve connected with the opposed low pressure faces of each said intensifier unit, means for supplying hydraulic pressure fluid at a delivery pressure including a control means shiftable to supply said fluid at delivery pressure alternately to each said pipe line and intensifier unit connected thereto, means simultaneously effective for supplying hydraulic pressure fluid at a predelivery pressure to the alternate pipe line and intensifier unit, a differential regulating valve having a valve body shiftable between predelivery pressure spill and nonspill positions, and shifting means for said valve body including a pressure sensing connection between said valve body and said hydraulic predelivery pressure supply means biasing said valve body to said spill position, and a pressure sensing connection between said differential regulating valve and each of said hydraulic pressure supply lines including a shuttle valve responsive to the differential pressure in said pipe lines shiftable to connect said hydraulic delivery pressure with said differential regulating valve.

6. In an intensifier assembly adapted for delivering a smooth and continuous flow of compressible fluid at a high delivery pressure comprising a plurality of intensifier units each having a high pressure piston face, and a plurality of low pressure piston faces, a compressed fluid delivery manifold, means connecting each said high pressure piston face for delivery of compressed fluid to said manifold against a back pressure determined by demand, means for supplying said compressible fluid at a precompression pressure to said high pressure piston faces, the combination of a separate pipe line connected with each said intensifier unit for supplying hydraulic pressure fluid to said low pressure piston faces, means supplying hydraulic pressure fluid at a delivery pressure including a control means shiftable to supply said fluid at delivery pressure to each said pipe line and connected intensifier unit in succession, means simultaneously effective for supplying hydraulic pressure fluid at a predelivery pressure to each other said pipe line and intensifier unit, and a differential pressure regulator connected between said predelivery pressure supply means and any said pipe line receiving said hydraulic pressure fluid at delivery pressure, said regulator comprising a differential valve element shiftable between predelivery pressure spill and nonspill positions, means including a sensing connection from said hydraulic predelivery pressure supply means biasing said differential valve element toward predelivery spill position, and a second sensing connection from said pipe line receiving said hydraulic pressure fluid at delivery pressure biasing said differential valve element toward nonspill position.

7. In an intensifier assembly adapter for delivering a smooth and continuous flow of compressible fluid at a high delivery pressure comprising a plurality of intensifier units each having a high pressure piston face, and a plurality of low pressure piston faces, a compressed fluid delivery manifold, means connecting each said pressure piston face for delivery of compressed fluid to said manifold against a back pressure determined by demand, means for supplying said compressible fluid at a precompression pressure to said high pressure piston faces, the combination of a separate pipe line connected with each said intensifier unit for supplying hydraulic pressure fluid to said low pressure piston faces, means supplying hydraulic pressure fluid at a delivery pressure including a control means shiftable to supply said fluid at delivery pressure to each said pipe line and connected intensifier unit in succession, means simultaneously effective for supplying hydraulic pressure fluid at a predelivery pressure to each other said pipe line and intensifier unit, and a differential pressure regulator connected with said predelivery pressure hydraulic pressure fluid supply means having delivery and predelivery hydraulic fluid pressure sensing connections responsive to a reduction of the pressure differential therebetween to spill the hydraulic pressure fluid supplied at predelivery pressure, said delivery pressure sensing connections including a sensing connection with each of said pipe lines and shuttle valves therebetween responsive to said pressure differential for channeling said delivery pressure from any selected pipe line and intensifier unit to said differential pressure regulator.

8. In an intensifier assembly adapted for delivering a smooth and continuous flow of compressible fluid at a high delivery pressure including a first, second and third intensifier unit each having a high pressure piston face, and a plurality of low pressure piston faces, a compressed fluid delivery manifold, means connecting each said high pressure piston face for delivery of compressed fluid to said manifold against a back pressure determined by demand, means for supplying said compressible fluid at a precompression pressure to said high pressure piston faces, the combination of a separate pipe line connected with each said intensifier unit for supplying hydraulic pressure fluid to said low pressure piston faces, means supplying hydraulic pressure fluid at a delivery pressure including a control means shiftable to supply said fluid at delivery pressure to each said pipe line and connected intensifier unit in succession, means simultaneously effective for supplying hydraulic pressure fluid at a predelivery pressure to each other said pipe line and intensifier unit, and a differential pressure regulator having a differential valve element shiftable between predelivery pressure spill and nonspill positions, and hydraulic delivery and predelivery pressure sensing means acting in opposite directions on said differential valve element and a differential pressure regulator connected with said predelivery pressure hydraulic pressure fluid supply means having delivery and predelivery hydraulic fluid pressure sensing connections responsive to a reduction of the pressure differential therebetween to spill the hydraulic pressure fluid supplied at predelivery pressure, said hydraulic fluid delivery pressure sensing connections including a shuttle valve having opposed inlets connected respectively with said first and second pipe lines, and an intermediate outlet, and a second shuttle valve having opposed inlets connected with the outlet of said first shuttle valve and with said third pipe line, and an intermediate outlet connected with said differential pressure regulator, whereby the admission of delivery pressure to any one pipe line adjusts said shuttle valves to connect said pipe line with said differential regulating valve, and to shut off the connections to the remaining pipe lines.

References Cited by the Examiner

UNITED STATES PATENTS

| | | | |
|---|---|---|---|
| 2,819,835 | 1/58 | Newhall | 230—53 |
| 2,874,544 | 2/59 | Switzer | 60—97 |

LAURENCE V. EFNER, *Primary Examiner.*

ROBERT M. WALKER, *Examiner.*